United States Patent
Naik et al.

(10) Patent No.: US 10,368,219 B2
(45) Date of Patent: *Jul. 30, 2019

(54) SYSTEM AND METHOD FOR EUICC PERSONALIZATION AND NETWORK PROVISIONING

(71) Applicant: Verizon Patent and Licensing Inc., Arlington, VA (US)

(72) Inventors: Rashmi Naik, Bridgewater, NJ (US); Sankar Shanmugam, Dayton, NJ (US); Pradeep Bharthur Shanthraj, Piscataway, NJ (US); David J. Strumwasser, Branchburg, NJ (US); Tarun Verma, Flemington, NJ (US); Denise Nicole Lyn-Shue, Cambridge, MA (US); Charles A. Laney, Cabot, AR (US); Moorthy Sengottaiyan, Somerset, NJ (US); Sudhin Vellooparambil Latheef, Hillsborough, NJ (US); Seng Kin Liew, Suwanee, GA (US); Thomas A. Warren, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/132,760

(22) Filed: Sep. 17, 2018

(65) Prior Publication Data

US 2019/0020989 A1 Jan. 17, 2019

Related U.S. Application Data

(63) Continuation of application No. 15/475,596, filed on Mar. 31, 2017, now Pat. No. 10,111,063.

(51) Int. Cl.
*H04W 4/50* (2018.01)
*H04W 8/18* (2009.01)
(Continued)

(52) U.S. Cl.
CPC ............... *H04W 4/50* (2018.02); *G04G 9/06* (2013.01); *G04G 21/08* (2013.01);
(Continued)

(58) Field of Classification Search
CPC ....... H04W 8/183; H04W 4/50; H04W 8/205; H04W 76/11
See application file for complete search history.

(56) References Cited

U.S. PATENT DOCUMENTS

| 8,606,232 B2 | 12/2013 | Siu et al. |
| 10,111,063 B1 * | 10/2018 | Naik ..................... H04W 8/183 |

(Continued)

*Primary Examiner* — William D Cumming

(57) ABSTRACT

A method is provided for self-provisioning and personalization of a companion device. A primary user device receives input to initiate a cellular service activation process for a companion device, wherein the companion device includes a preloaded version of a service provider application for facilitating remote provisioning. The primary device provides, to the companion device, an updated version of the service provider application that replaces the preloaded version. The primary device receives, from the companion device, an embedded universal integrated circuit card (eUICC) identifier for the companion device and forwards the eUICC identifier to a network device and an identifier for the primary device. When the network device verifies that the cellular service activation for the companion device can be provisioned, the primary device receives an activation code for the companion device to use to initiate a request for a new line of service for the eUICC identifier and forwards the activation code to the companion device.

20 Claims, 11 Drawing Sheets

(51) Int. Cl.

| | | |
|---|---|---|
| | *H04W 8/20* | (2009.01) |
| | *H04M 1/725* | (2006.01) |
| | *H04L 29/12* | (2006.01) |
| | *H04W 76/11* | (2018.01) |
| | *G04G 9/06* | (2006.01) |
| | *G04G 21/08* | (2010.01) |
| | *H04L 29/08* | (2006.01) |

(52) U.S. Cl.
CPC .......... *H04L 61/1588* (2013.01); *H04L 67/30* (2013.01); *H04M 1/7253* (2013.01); *H04W 8/183* (2013.01); *H04W 8/205* (2013.01); *H04W 76/11* (2018.02)

(56) References Cited

U.S. PATENT DOCUMENTS

| | | | |
|---|---|---|---|
| 2010/0162294 A1 | 6/2010 | Yin et al. | |
| 2011/0098030 A1 | 4/2011 | Luoma | |
| 2012/0036245 A1 | 2/2012 | Dare et al. | |
| 2016/0269786 A1 | 9/2016 | Lee et al. | |
| 2017/0180349 A1 | 6/2017 | Park | |
| 2017/0374429 A1 | 12/2017 | Yang | |
| 2018/0026733 A1 | 1/2018 | Yang et al. | |
| 2018/0288560 A1* | 10/2018 | Naik | H04W 8/183 |
| 2019/0020989 A1* | 1/2019 | Naik | H04W 8/183 |

\* cited by examiner

SYSTEM AND METHOD FOR EUICC PERSONALIZATION AND NETWORK PROVISIONING

CROSS REFERENCE TO RELATED APPLICATION

This application is a continuation of U.S. patent application Ser. No. 15/475,596 filed on Mar. 31, 2017, the contents of which are incorporated herein by reference.

BACKGROUND

Today, Universal Integrated Circuit Cards (UICC), such as subscriber identity module (SIM) cards, are individually formatted with a service provider's authentication credentials, an International Mobile Subscriber Identity (IMSI), an integrated circuit card identifier (ICCID), etc. in secured UICC vendor factories as part of the UICC manufacturing process. For devices that are branded for a specific wireless service provider, the UICC is typically pre-inserted into a device at the OEM facility or it may also be inserted at time of sale. When the user receives a device branded for the service provider, it will have a UICC with the service provider's credentials already present and available for activation.

Wireless device manufacturers seek to globalize their devices, such that one make/model of a device can support all wireless carriers across the globe and also allow consumers to have multiple subscriptions on the same device. One key for global devices is the ability to conveniently modify the device SIM profile to support different wireless carriers, such as in instances in which the UICC is not easily accessible or is permanently installed into the device. Industry standards are now moving toward dynamic personalization that provides the ability to dynamically change the SIM profile on an embedded UICC (eUICC) after manufacture. This dynamic personalization typically requires user input, such as to enter (or scan) a QR activation code or similar code, which can be cumbersome to provide when the eUICC is used in a small form factor device, such as a wearable device.

DETAILED DESCRIPTION OF PREFERRED EMBODIMENTS

Figure 1:
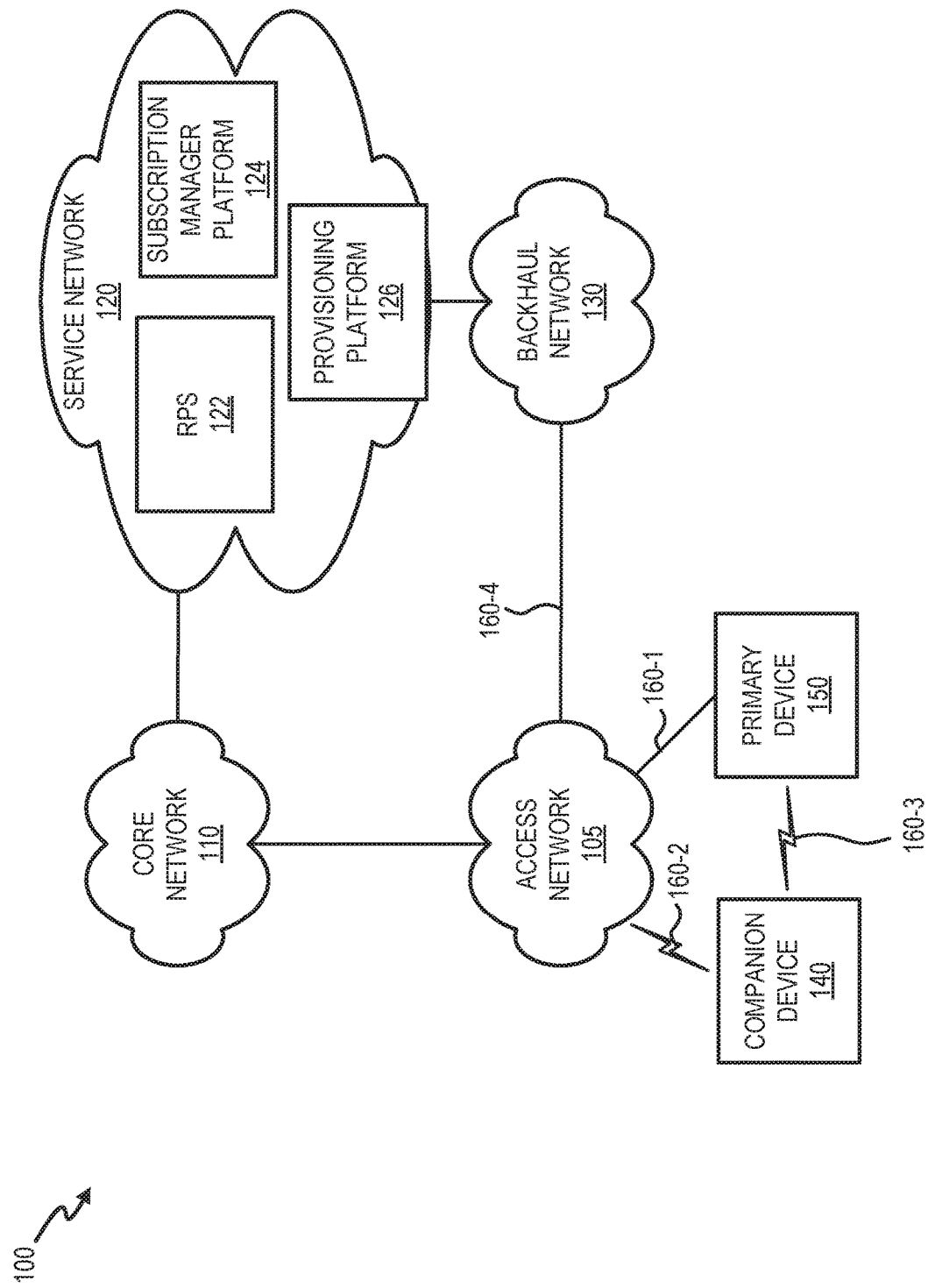
FIG. 1 is a diagram illustrating an exemplary network in which systems and/or methods described herein may be implemented.

The following detailed description refers to the accompanying drawings. The same reference numbers in different drawings may identify the same or similar elements.

The use of cellular data service is becoming a more popular option for electronic devices that have not traditionally included such functionality, such as wearable devices including smart watches, fitness bands, activity trackers, clip-on monitors, as well as other types of devices, such as vehicle-based systems (telematics or infotainment systems), smart appliances or other Internet of Things (IoT) devices, etc. A companion application for use on a smartphone (or other computing device) is sometimes made available for use in conjunction with the electronic device. The smartphone or other computing device is referred to herein as a "primary device" or "primary user device" and the electronic device is referred to herein as a "companion device."

Dynamic personalization for cellular devices, as described in industry standards, provides the ability to dynamically change the SIM profile on an eUICC after card manufacture, without physically changing device hardware. Systems and methods described herein facilitate dynamic personalization and remote provisioning of the eUICC for a companion device. More particularly, the systems and methods described herein simplify the process for an end user to fully self-activate a companion device remotely. In one implementation, the process may be executed directly from the companion device that is pre-installed with a pre-personalized eUICC profile. In another implementation, the process may use a primary device as an available/paired device to provide network connectivity needed to activate a companion device under a subscriber billing account associated with the paired primary device and to allow for download of the required eUICC profile. Additionally, the primary device allows for an enhanced end user experience, not only for ease of activation request submission, but also to allow for review of any errors using a more user friendly interface than can be accommodated on the companion device.

According to one implementation, a method is provided for dynamic self-provisioning and personalization of a companion device. A primary device may receive, via an activation application for cellular service activation of a companion device, user input to initiate a cellular service activation process for the companion device. The primary device may establish a local network connection with the companion device and may receive from the companion device an eUICC identifier. The primary device may forward, to a network device in a service provider network, the eUICC identifier along with an identifier for the primary user device. After a network device verifies that cellular service for the companion device can be activated under a subscriber account associated with the primary device, the primary device may receive, from the network device, an activation code for the eUICC and may forward to the companion device the activation code via the local network connection. The activation code may automatically cause the companion device to initiate a profile download request for an eUICC to be included with a new line of service under a subscriber account associated with the primary user device.

FIG. 1 is a diagram illustrating an exemplary environment 100 in which systems and methods described herein may be implemented. As illustrated, environment 100 may include an access network 105, a core network 110, a service network 120, a backhaul network 130, a companion device 140, and a primary device 150. Service network 120 may have multiple network elements including, but not limited to, a remote personalization server (RPS) 122, a subscription manager platform 124, and a provisioning platform 126. For purposes of description, RPS 122, subscription manager platform 124, provisioning platform 126, companion device 140, and primary device 150 may be referred to as network elements within environment 100.

As further illustrated, environment 100 includes communicative links 160 between the network elements and networks (although only four are referenced in FIG. 1 as links 160-1, 160-2, 160-3, and 160-4). A network element may transmit and receive data via a link 160. Environment 100 may be implemented to include wireless and/or wired (e.g., electrical, optical, etc.) links 160. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 160 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device). The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be numerous companion devices 140, primary devices 150, and so forth. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. In aspects where access network includes a RAN, devices (e.g., companion device 140, primary device 150) may require activation by a service provider to use access network 105. In other aspects, access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complementary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include a private IP network, an Internet Protocol (IP) Multimedia Subsystem (IMS) network, a cloud network, a wide area network (WAN), a metropolitan area network (MAN), the Internet, the World Wide Web, a service provider network, some other type of backend network, and so forth. As illustrated, according to an exemplary embodiment, service network 120 includes RPS 122, subscription manager platform 124, and provisioning platform 126. According to other exemplary embodiments, RPS 122, subscription manager platform 124, provisioning platform 126, and/or a portion thereof may be implemented in another network, such as core network 110.

RPS 122 may include one or more network devices, or other types of computation or communication devices, to facilitate self-serve personalization and remote provisioning of companion device 140. In one implementation, RPS 122 may apply user information from service provider activation application 420 and/or service provider application 310 to associate companion device 140 with an account for primary device 150. RPS 122 may initiate provisioning for activation of companion device 140 on the carrier network and communicate with primary device 150 to forward information (such as an activation code) to companion device 140.

Subscription manager platform 124 may include one or more network devices, or other types of computation or communication devices, to manage activation of cellular devices on the carrier network. Subscription manager platform 124 may receive registration data, billing data, provisioning instructions, and other account settings for mobile devices. Subscription manager platform 124 may communicate with network devices in core network 110—such as a home subscriber server (HSS)/authentication, authorization, and accounting (AAA) server, a policy and charging rules function (PCRF) device—to assign activation codes, unique identifiers, and authenticators for cellular devices, including companion device 140.

Provisioning platform 126 may include one or more engineering, operation, and inventory databases and systems that maintain and provide information relating to activating and provisioning service orders in network environment 100. Provisioning platform 126 may include tools for enabling entry and tracking of customer service orders and may actively transmit information regarding the orders to other systems in network environment 100, such as a billing system (not shown). In some implementations, provisioning platform 126 may include inventory information associated with all devices and equipment within environment 100, including companion devices 140, primary devices, 150, cabling, wiring, network devices, etc.

Backhaul network 130 includes one or multiple networks of one or multiple types. According to an exemplary implementation, backhaul network 130 includes a backbone network. For example, the backbone network may be implemented as an optical transport network or other suitable architecture. According to one implementation, backhaul network 130 provides a connection path from access network 105 to service network 120. According to another implementation, when access network 105 is implemented as an LTE RAN or an LTE-A RAN, backhaul network 130 may directly connect to an eNB. In some instances, access network 105, core network 110, service network 120, and backhaul network 130 may be collectively referred to as a carrier network.

Companion device 140 may include a communication and computational device. For example, companion device 140 may include a smart watch, a fitness tracker, or another device that may be worn or otherwise coupled to a user. In some examples, companion device 140 may take the form of a wristband-mounted device (like a wristwatch) or another wearable form factor, such as a pendant style device configured for wearing via a chain or lanyard, a brooch or other pin-on or clip-on on style device, an armband-mounted device, etc. Companion device 140 may include one or multiple applications which may be executed on companion device 140 to perform particular functions, such as communications (e.g., texts, emails, voice), information (e.g., weather, news, sports), monitoring (e.g., movements, vital signs, etc.), and other functions. According to an exemplary embodiment, companion device 140 may include a communication interface via which companion device 140 can transmit and receive data. For example, companion device 140 may be implemented to include various technologies, such as a sensor, a tag, a camera, an antenna, etc., that collect, obtain, and/or generate data. In other implementations, companion device 140 may include a vehicle-based system (e.g., telematics or infotainment system), a smart appliance, or another IoT device. In some aspects, companion device 140 may be an embedded device, such as micro-controller for a tool, footwear, toy, etc.

According to an implementation, the communication interface for companion device 140 includes a cellular modem, such as an LTE and/or an LTE-A modem (referred to herein as an "LTE modem"). In one implementation, companion device 140 may transmit data to service network 120 via core network 110. According to an exemplary embodiment, companion device 140 includes a service provider application that assists with cellular activation of companion device 140.

Primary device 150 may include a communication and computational device. Primary device 150 may be implemented as a mobile device, a portable device, or a stationary device. For example, primary device 150 may be implemented as a smartphone, a tablet device, a computer (e.g., a laptop, a desktop, a palmtop, etc.), a personal digital assistant, a terminal, and so forth. In one implementation, primary device 150 may include a communication interface with a cellular modem (e.g., LTE modem) and a local wired/wireless interface (e.g., a universal serial bus (USB) port for communications over a cable, a Bluetooth® (BT)/BT Embedded System (BTE) or BT Low Energy (BTLE) interface, a near-field communication (NFC) wireless interface, and/or a Wi-Fi interface. According to an exemplary embodiment, primary device 150 includes a companion application for companion device 140 that assists with cellular activation of companion device 140.

Links 160 provide communication paths between network elements and/or networks of environment 100. Links 160 may have certain characteristics, such as bandwidth capacity, transmission data rate, and the like.

Figure 2:
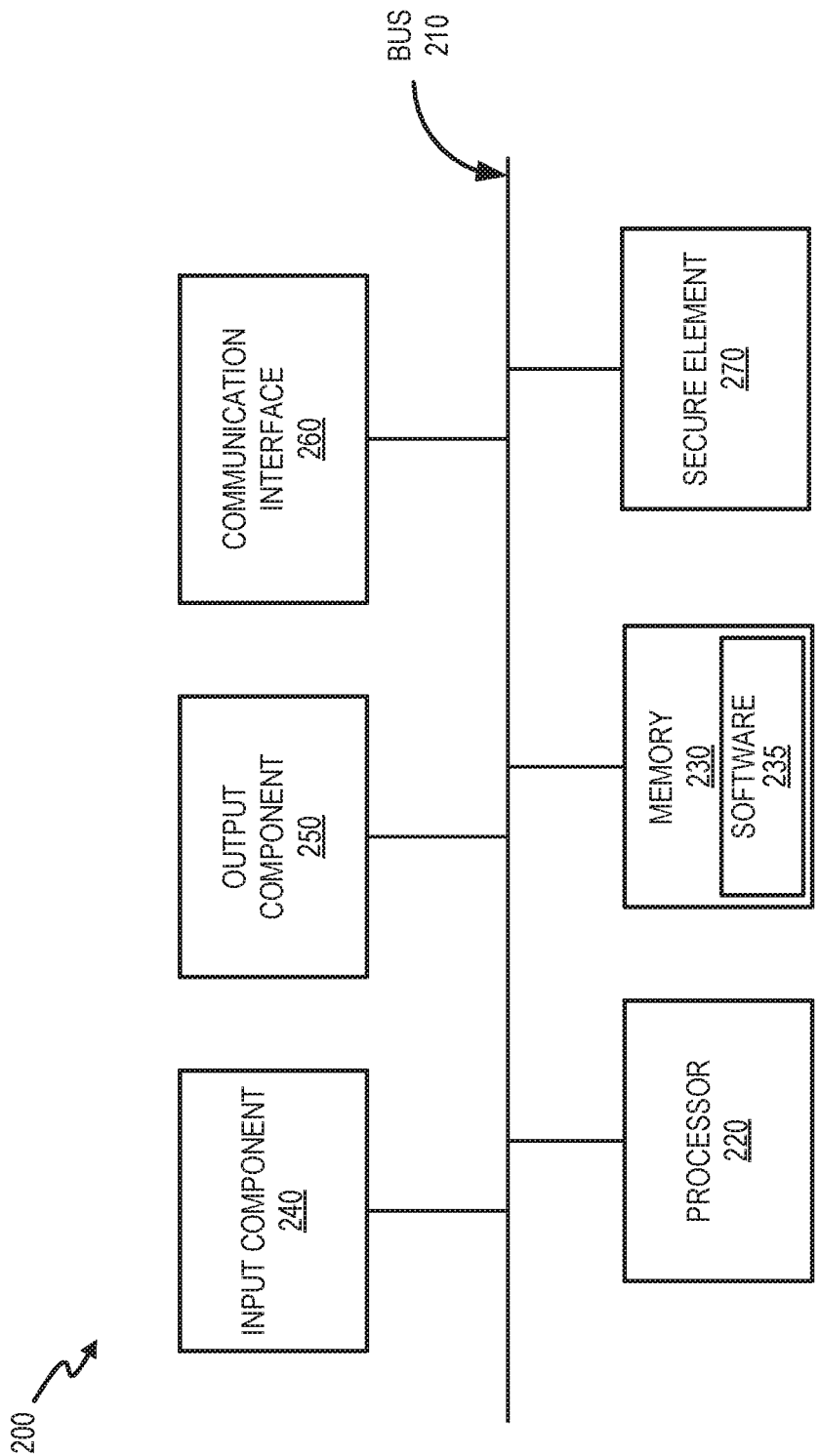
FIG. 2 is a block diagram illustrating exemplary components of a device that may correspond to a companion device, primary device, or a network device of FIG. 1.

FIG. 2 is a diagram illustrating exemplary components of a device 200, according to an implementation described herein. Each of companion device 140 and primary device 150 may be implemented as a combination of hardware and software on one or more of device 200. As shown in FIG. 2, device 200 may include a bus 210, a processor 220, a memory 230, an input component 240, an output component 250, a communication interface 260, and a secure element 270.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 is also intended to include firmware, middleware, microcode, hardware description language (HDL), and/or other form of instruction. By way of example, when device 200 is a companion device 140, software 235 may include a local profile agent from a third-party and a service provider application from the service provider of service network 120. As another example, when device 200 is a primary device 150, software 235 may include a companion application from the third party and service provider activation application from the service provider of service network 120.

Input component 240 may include a mechanism that permits a user to input information to device 200, such as a keyboard, a keypad, a button, a switch, touch screen, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. For example, when device 200 is a primary device 150, communication interface 260 may receive local RF signals over the air from, and transmit RF signals over the air to, companion device 140. In one implementation, for example, communication interface 260 may communicate with a network and/or devices connected to a network. For example, when device 200 is a companion device 140, communication interface 260 may communicate with peripheral devices (such as push button, thermal sensor, etc.) to receive activity event or collect data. Alternatively or additionally, communication interface 260 may be a logical component that includes input and output ports, input and output systems, and/or other input and output components that facilitate the transmission of data to other devices.

Secure Element (SE) 270 may be embedded within a secure element interface (e.g., a SIM card interface) of companion device 140 or primary device 150. SE 270 may store secure applications and data to permit companion device 140 or primary device 150 to perform secure exchanges with other network entities. SE 270 provides the security and confidentiality required to perform validation of a user's identity for access to core network 110, and/or support trusted exchanges among various network entitles in networking environment 100. In one embodiment, SE 270 may be permanently coupled to companion device 140, and thus cannot be removed by a user. According to one implementation for companion device 140, SE 270 may include an eUICC that can be remotely provisioned.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. As another example, device 200 may include one or more switch fabrics instead of, or in addition to, bus 210. Additionally, or alternatively, one or more components of device 200 may perform one or more tasks described as being performed by one or more other components of device 200.

Figure 3:
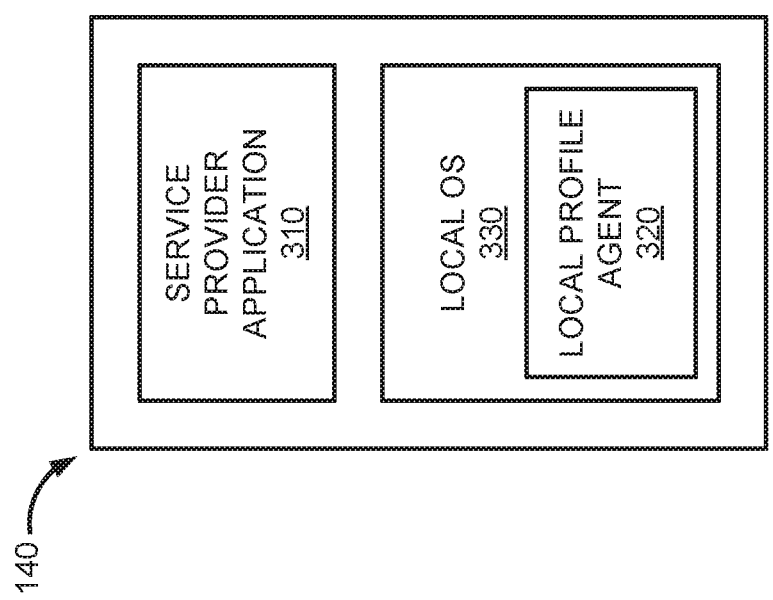
FIG. 3 is a diagram of functional components of the companion device of FIG. 1.

FIG. 3 is a diagram of functional components of companion device 140. The functional components of FIG. 3 may be implemented, for example, by processor 220 in conjunction with memory 230/software 235. As shown in FIG. 3, companion device 140 may include a service provider application 310 and a local profile agent 320 within a local operating system 330 (e.g., an embedded OS, etc.).

Service provider application 310 may include instructions to facilitate self-serve personalization and remote provisioning of companion device 140. Service provider application 310 may interface with other applications and functions, such as local profile agent 320 and operating system 330, to collect and provide user/account information used to activate or update a line of service for companion device 140. Service provider application 310 may include personalization and configuration settings for an end-user associated with companion device 140 and primary device 150. For example, service provider application 310 may include an indication of a user's account standing as an account owner or account member, which may have different account privileges. Service provider application 310 may also include or be able to automatically retrieve a mobile directory number (MDN) of a primary device. In some instances, service provider application 310 may be provided as an initial version at factory configuration and then updated upon an initial pairing between companion device 140 and primary device 150.

Local profile agent 320 may perform operations to activate and/or update a SIM profile. Local profile agent 320 may respond to instructions from service provider application 310 to send an activation code, provide an eUICC identifier, and provide eUICC profile information. Local profile agent 320 may download a SIM profile, perform modem reset, and initiate device activation to activate companion device 140 on a carrier network.

Operating system 330 may include logic to manage functions of companion device 140. For example, in one implementation, operating system 330 may include logic to collect and provide data from internal sensors or peripheral sensors associated with companion device 140. Operating system 330 may rely on wireless communications, and particularly cellular communications using access network 105, to perform some functions. In one implementation, operating system 330 may be implemented as a real-time operating system (RTOS). Operating system 330 may also receive and store configuration settings, user profiles, and other user input to manage operation of companion device 140. For example, operating system 330 may store or access an international mobile equipment identity (IMEI) for companion device 140.

Figure 4:
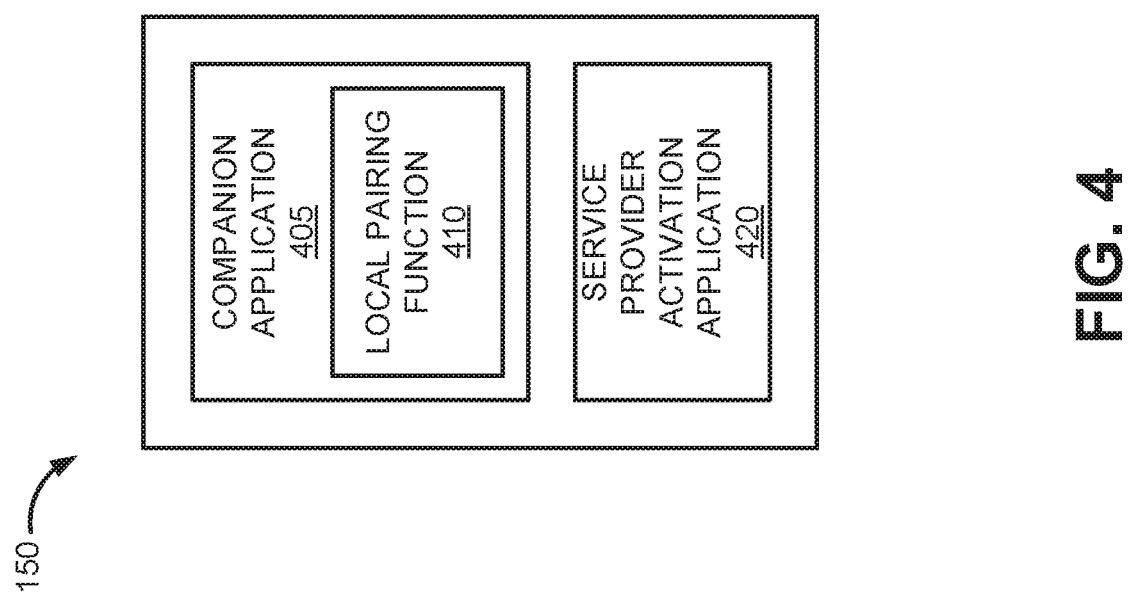
FIG. 4 is a diagram of functional components of the primary device of FIG. 1.

FIG. 4 is a block diagram illustrating an exemplary functional component of primary device 150. The functional components of FIG. 4 may be implemented, for example, by processor 220 in conjunction with memory 230/software 235. In another implementation, some functional components of FIG. 4 may be implemented via a web browser interface in conjunction with partner server 160 or provider network 120. As shown in FIG. 4, primary device 150 may include a companion application 405 including a local pairing function 410, and a service provider activation application 420.

Companion application 405 may generally include an application to manage settings for companion device 140. Companion application 405 may provide an interface to allow a user to configure different settings for companion device 140. In one implementation, companion application 405 may include a setup module for an initial configuration of companion device 140. The setup module may include a call to service provider application 310 to initiate cellular service activation for companion device 140. In other implementations, companion application 405 may provide additional features (not shown) such as monitoring, sharing data, providing alerts, etc.

Local pairing function 410 may initiate a local wireless connection between primary device 150 and companion device 140. In one implementation, local pairing function may include instructions to initiate the local wireless connection in response to user input to primary device 150 for an initial setup or activation.

Service provider activation application 420 may facilitate subscription management for companion device 140 and may pass parameters to perform activation of companion device 140 to/from RPS 122. In one implementation, service provider activation application 420 may include some or all features of service provider application 310, including personal user information, such as an MDN of primary device 150 and an account standing (e.g., owner, member, etc.) of the end-user associated with primary device 150.

Figure 5:
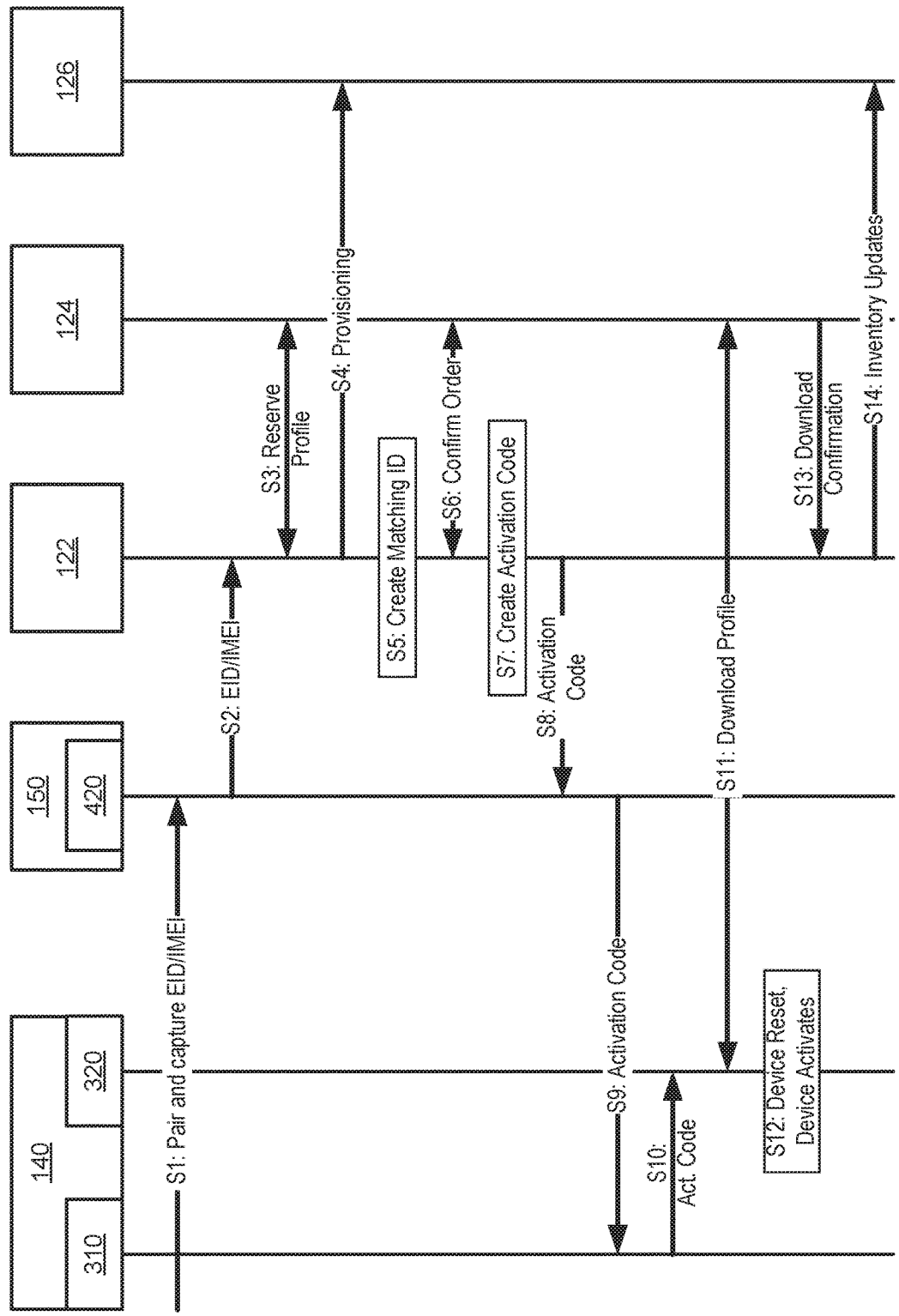
FIG. 5 is a diagram illustrating exemplary communications among network elements in apportion of the network of FIG. 1.

FIG. 5 is a diagram of exemplary communications among devices in a portion 500 of network environment 100. Communications in FIG. 5 may represent communications for activating cellular service for a companion device with assistance from a primary device. As shown in FIG. 5, network portion 500 may include RPS 122, subscription manager platform 124, provisioning platform 126, companion device 140, and primary device 150. RPS 122, subscription manager platform 124, provisioning platform 126, companion device 140, and primary device 150 may include features described above in connection with FIGS. 1-4.

Companion device 140 may pair with primary device 150 in step S1. For example, an end user may launch local pairing function 410 (e.g., an Android® Wear app, a Samsung® Wear app, etc.) on primary device 150 that causes primary device to initiate a pairing of companion device 140 and the primary device 150 over a local wireless connection (e.g., using BT/BTE). Local pairing function 410 may hand off to SP activation application 420 to perform a personalization sequence. As part of the personalization sequence, SP activation application 420 on primary device 150 captures an EUICC ID (EID)/IMEI from companion device 140.

In step S2, SP activation application 420 provides the EID/IMEI to RPS 122 using, for example, a wireless connection and an address for RPS 122 provided in SP activation application 420.

In step S3, RPS 122 may request reservation, by subscription manager platform 124, of a profile for the specific EID of step S2 (e.g., the EID of companion device 140). RPS 122 may be used as an eUICC personalization gateway and may support interfaces with subscription manager platform 124. For the provided EID, subscription manager platform 124 reserves an integrated circuit card identifier (ICCID) (e.g., a binding process) for the specified reservation request. The ICCID corresponds to a binary image file, which will be later downloaded to eUICC 330. Subscription manager platform 124 may provide the ICCID to RSP 122.

In step S4, RPS 122 may create a wireless service provisioning request, which is sent to provisioning platform 126 for distribution to billing servers and other network elements, for example, in core network 110.

At step S5, RSP 122 may construct a matching ID based on the MDN of companion device 140 and a unique transaction number. At step S6, RSP 122 may send a download profile request, including the ICCID and the matching ID, to subscription manager platform 124. Subscription manager platform 124 may, in response, return the acknowledged ICCID to RSP 122.

At step S7, RSP 122 creates an activation code based on the matching ID for companion device 140 and a fully qualified domain name (FQDN) of subscription manager platform 124. In step S8, RSP 122 may send the activation code for companion device 140 to SP activation application 420 on primary device 150. At step S9, primary device 150 may forward the activation code to service provider application 310 on companion device 140, using the paired BT connection.

At step S10, service provider application 310 on companion device 140 may send the activation code to local profile agent 320 on companion device 140. As step S11, local profile agent 320 may initiate a connection to subscription manager platform 124 (e.g., using the FQDN from the activation code) and download the profile with the corresponding activation code.

At step S12, local profile agent 320 receives the profile, resets the modem (e.g., the LTE modem) of companion device 140, and companion device 140 is able to activate on the service provider network. In step S13, subscription manager platform 124 may confirm successful download to RSP 122. In response, at step S14, RSP 122 may perform inventory update functions with provisioning platform 126.

Figure 6:
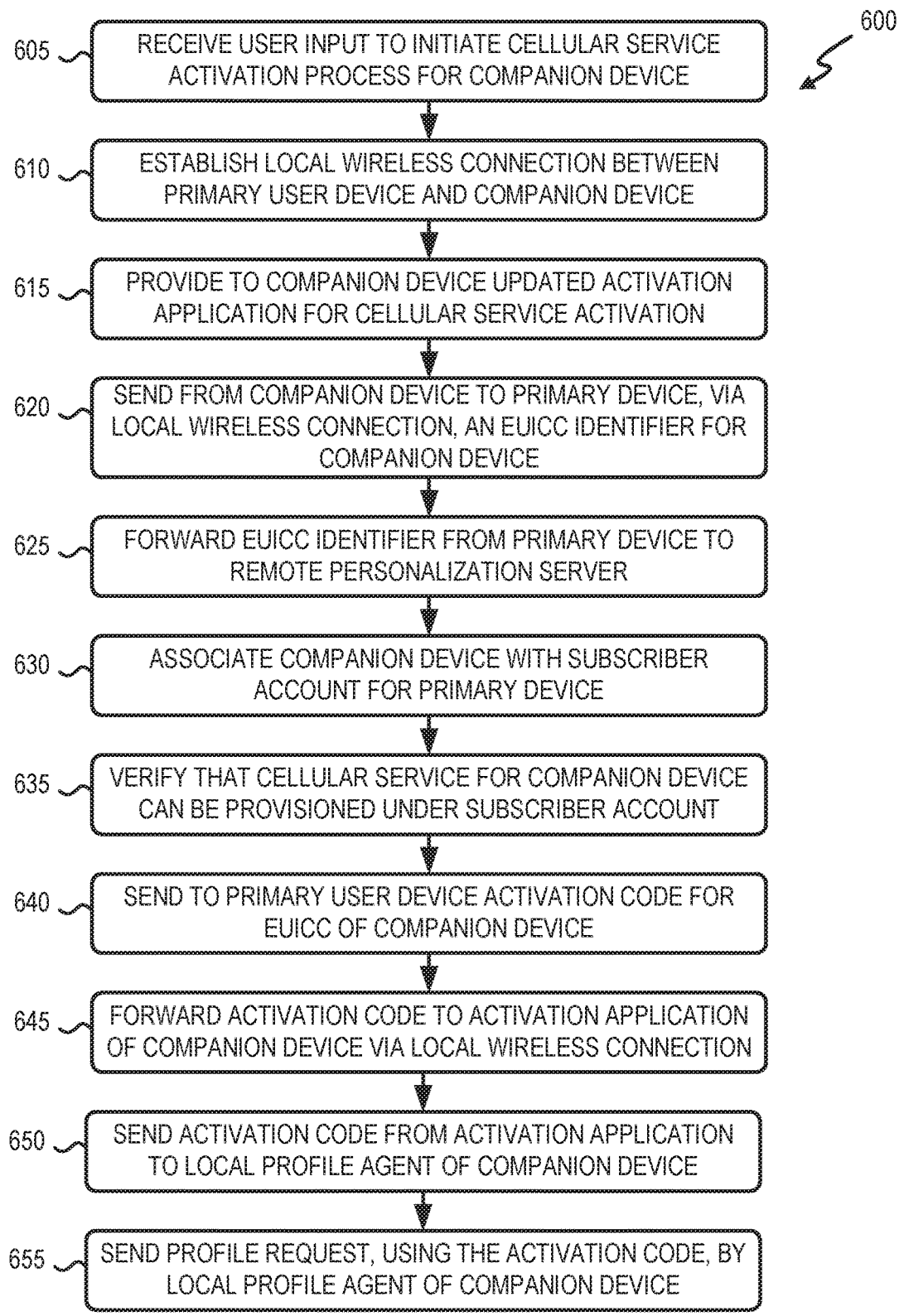
FIG. 6 is a flow diagram illustrating an exemplary process for provisioning an eUICC of a companion device for cellular activation, according to an implementation described herein.

FIG. 6 is a flow diagram illustrating an exemplary process 600 for provisioning an eUICC of a companion device for cellular activation according to an implementation described herein. In one implementation, process 600 may be performed by companion device 140 and primary device 150. In another implementation, some or all of process 600 may be performed by companion device 140 or primary device 150 along with another device or group of devices in network environment 100.

As shown in FIG. 6, process 600 may include receiving user input to initiate a cellular service activation process for a companion device (block 605), establishing a local wireless connection between a primary user device and the companion device (block 610), and providing to the companion device an updated activation application for cellular service activation, where an updated activation application is available (block 615). For example, a user may download to their primary device 150 a companion application (e.g., companion application 405) for companion device 140. The companion application may include local pairing function 410 to initiate a local wireless connection, between primary device 150 and companion device 140, in response to user input on primary device 150. Once paired, in one implementation, companion application 405 may automatically (e.g., without additional user input) initiate an update of service provider application 310. Service provider application 310 may include some or all features of service provider activation application 420, including personal user information, such as an MDN of primary device 150 and an account standing (e.g., owner, member, etc.) of the end-user associated with primary device 150.

Process 600 may also include sending from the companion device to the primary device, via the local wireless connection, an eUICC identifier for the companion device (block 620), and forwarding the eUICC identifier from the primary device to a remote personalization server (block 625). For example, service provider application 310 on companion device 140 may obtain the eUICC identifier from local profile agent 320 and provide the eUICC identifier to service provider activation application 420 on primary device 150. Primary device 150 may receive the eUICC identifier via the local wireless connection and may forward the eUICC identifier with other identification for primary device 150 to RPS 122.

Process 600 may further include associating the companion device with a subscriber account for the primary device (block 630), and verifying that cellular service for the companion device can be provisioned under the subscriber account (block 635). For example, RPS 122 may receive the eUICC identifier of companion device 140 and MDN (or other identifier) of primary device 150. RPS 122 may verify, for example, that the user associated with primary device 150 is authorized to add a new line of service for the account associated with primary device 150, whether other companion devices are already associated with the primary device 150, that the account is in good standing, etc.

Process 600 may additionally include sending to the primary user device an activation code for the eUICC of the companion device (block 640), forwarding the activation code to the activation application of the companion device via the local wireless connection (block 645). For example, RPS 122 may generate an activation code for companion device 140 and send it to primary device 150. Primary device 150 may receive the activation code and forward the activation code to service provider application 310 on companion device 140 via the local wireless pairing.

Process 600 may also include sending the activation code from the activation application to a local profile agent of the companion device (block 650), and sending by the local profile agent of the companion device a profile request using the activation code (block 655). For example, once received from primary device 150, service provider application 310 may forward the activation code to local profile agent 320. Local profile agent 320 may use the activation code to generate a SIM profile request that can be sent directly to subscription manager platform 124 (e.g., without relying on primary device 150). Thus, companion device 140 can be personalized and provisioned using a self-serve process with minimal user input to either companion device 140 or primary device 150.

Figure 7:
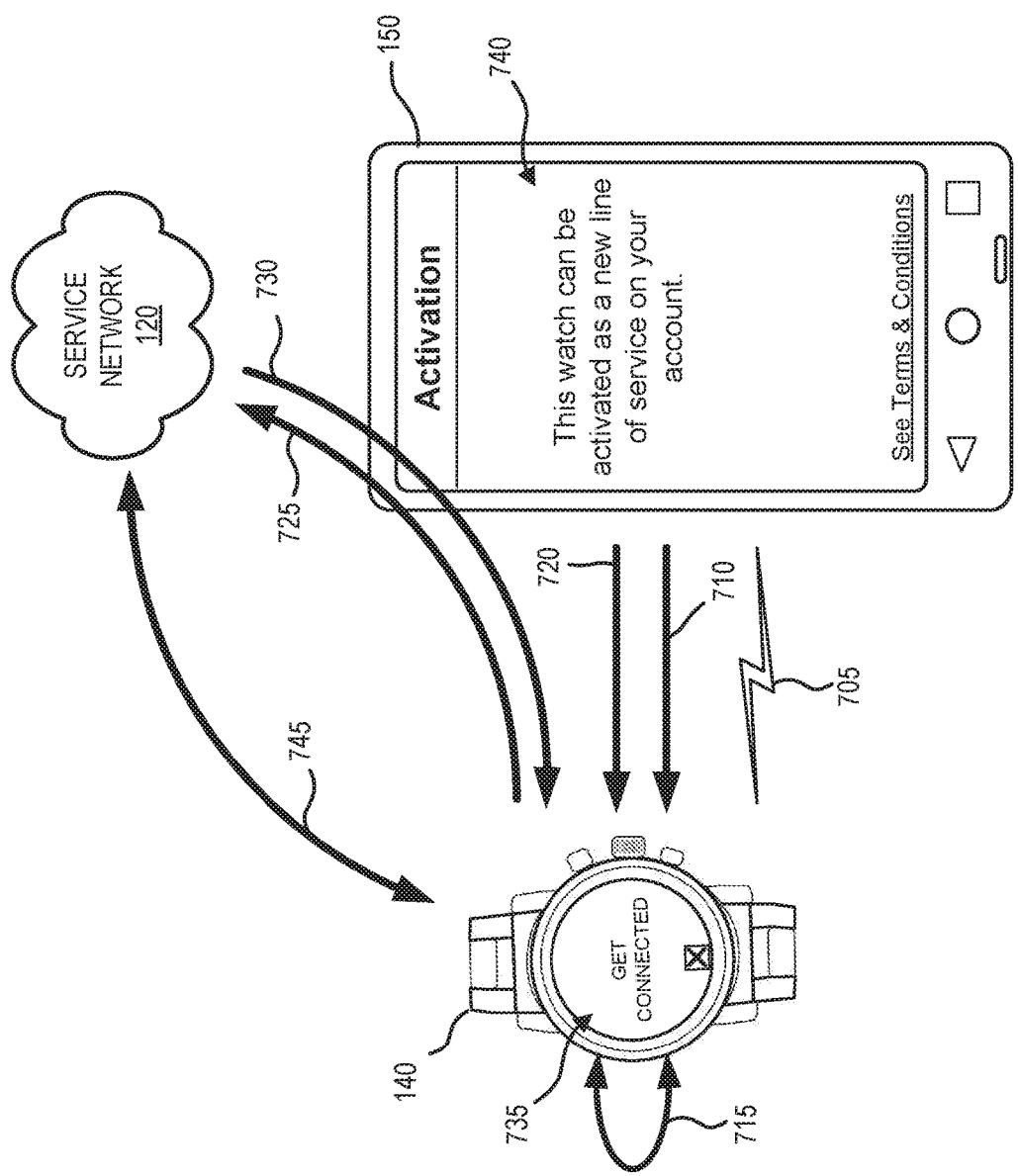
FIGS. 7-10 are diagrams illustrating use cases relating to provisioning an eUICC of a companion device, according to implementations described herein.

FIG. 7 provides an illustration of a use case for end-user interactions during a first time synchronization of companion device 140 with primary device 150, according to an implementation. In the example of FIG. 7, assume primary device 150 includes a third-party application (e.g., Android® Wear, Samsung® Wear, etc.) for interacting with companion device 140 and for pairing with companion device 140 (e.g., shown in FIG. 7 as a smart watch). Also, companion device 140 is provided with an eUICC that has no SIM profile.

A user (e.g., end-customer) turns on companion device 140. Local profile agent 320 on the companion device 140 helps the primary device 150 and the companion device 140 to get paired 705 via a Bluetooth® connection or another short range wireless interface. In another implementation, companion device 140 and primary device 150 may be paired over a wired interface.

Companion device 140 may have a preloaded version of the service provider application (e.g., service provider application 310). When companion device 140 and primary device 150 are paired, a package replacement 710 of service provider application 310 follows (i.e., service provider application 310 on companion device 140 is replaced by service provider activation application 420 on primary device 150). A package replace intent is sent from the local pairing function 410 (e.g., the Android framework) and service provider activation application 420 listens to this intent to identify that pairing is now complete.

Service provider application 310 then queries 715 local profile agent 320 on companion device 140 to get the SIM profile information if a profile is available. For example, service provider application 310 may have exchanges with local profile agent 320 such as "Query EID" or "Query Profile." In one implementation, queries 715 may also include a query IMEI to operating system 330 to obtain the IMEI for companion device 140. If not already provided through package replacement 710, service provider application 310 may also obtain 720 information from primary device 150, such as the primary device MDN, that will enable companion device 140 to be associated with primary device 150 for back-end queries.

Service provider application 310 then sends query 725, via primary device 150, to back end systems (e.g., server 122 in service network 120) that are systems of record to identify the next steps to execute. Specific information from companion device 140 like the IMEI, ICCID, and EID are used when back end system is queried. Specific information from primary device 150 may also be used, such as the MDN of primary device 150, an application version of service provider activation application 420, etc. The back-end systems may determine, for example, based on the subscriber's records, that companion device 140 is eligible for a new line of service or that companion device 140 may be a device upgrade (e.g., a replacement device for an existing line of service). This determination may be indicated in response 730 provided to companion device 140 via primary device 150. For example, if no companion device is associated with the MDN of primary device 150, companion device 140 may be added as a new line of service. In response, companion device 140 may display a specific notification called "Get Connected" 735. However, if other companion devices are associated with the MDN of primary device 150, companion device 140 may be used to upgrade an existing device on the account. In this scenario, a different notification (not shown), such as "Upgrade Device," may be displayed with a presentation of companion devices eligible to be upgraded. In one implementation, additional information 740 may be presented via primary device 150.

When service provider application 310 determines that companion device 140 needs to be personalized, local profile agent 320 on companion device 140 may be utilized to download 745 the required SIM profile directly from service network 120. Service provider application 310 may have has interactions with local profile agent 320 like "Send Activation Code," "Register for download complete callback," etc.

Figure 8:
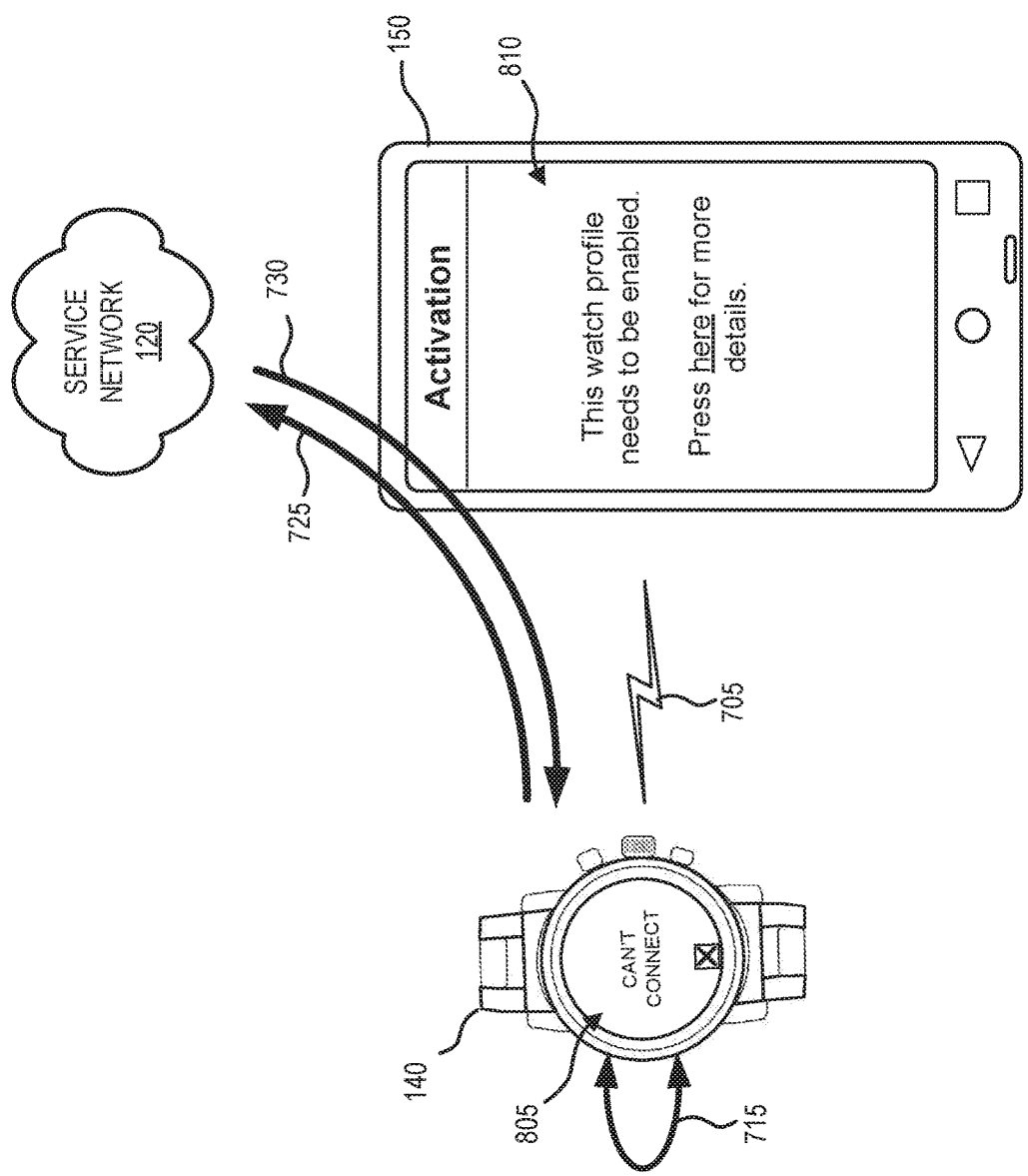

FIG. 8 provides an illustration of a use case for a subsequent reboot of companion device 140 or synchronization of service provider application 310, according to an implementation. Service provider application 310 listens to events related to companion device 140 reboot and app sync. No package replace happens in this flow. On a reboot of companion device 140 or app sync of the companion device 140 (e.g., after the first time boot/app sync), service provider application 310 on companion device 140 will repeat the interactions with local profile agent 320 and backend systems in in core network 110 or service network 120 (e.g., references 715, 725, 730 of FIG. 7).

The back-end systems may determine, for example, based on the subscriber's records, that (1) companion device 140 has not been activated and is eligible for a new line of service; (2) companion device 140 has not been activated and may be a device upgrade; (3) companion device 140 is an already active device, but the profile was deleted from companion device 140; or (4) companion device 140 is an already active device, but the profile was disabled on companion device 140. If any of options (1), (2), or (3) are determined, companion device 140 may present the "Get Connected" option to the user, similar to the description of FIG. 7. However, if the profile was disabled on companion device 140 (option (4)), a specific notification called "Can't Connect" may be displayed on companion device 140. Using local connection 705, service provider application 310 may have service provider activation application 420 provide additional information 810 via primary device 150.

Figure 9:
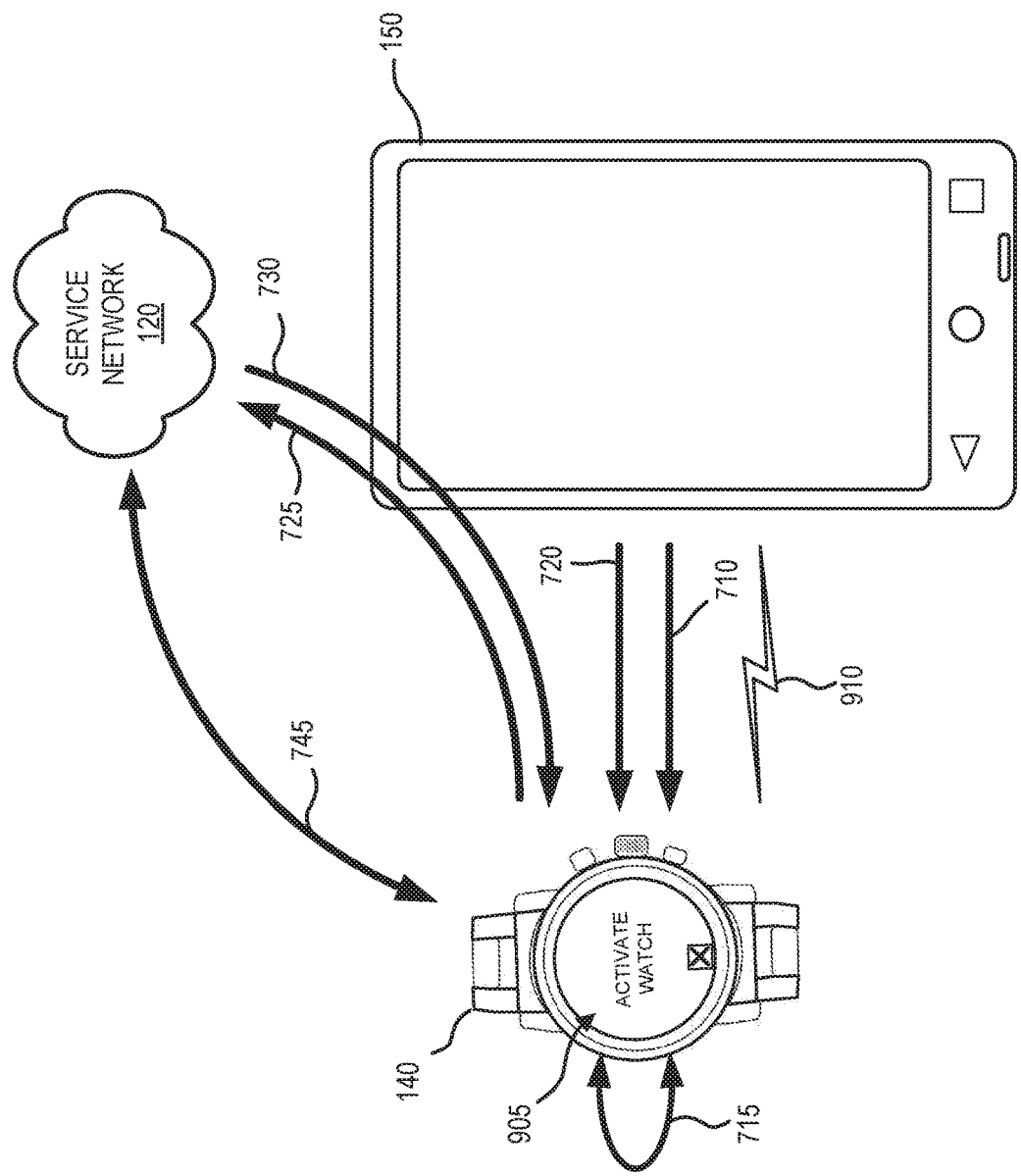

FIG. 9 provides an illustration of a use case for another entry point for a user to initiate a personalization and provisioning process from companion device 140, according to an implementation. In the use case of FIG. 9, companion device 140 may initiate pairing and activation, in contrast to the primary device 150 activation initiation described above. In this example, an entry point or user option referred to as "Activate Watch" may be available to the user as an item from the list of all applications on companion device 140. This entry point may be separate from the notifications (e.g., notification 735) previously described. When activate watch launcher 905 is selected, companion device 140 may initiate a local wireless pairing 910 with primary device 150. Once paired, companion device 140 may retrieve updates and primary device 150 information to support exchanges with back end systems in core network 110 or service network 120, as described above in connection with, for example, FIGS. 7 and 8.

After a profile download is successfully performed, companion device 140 may remove the "Activate Watch" launcher from the application list. On a subsequent reboot or app sync, if companion device 140 is found to be not active on the network, the launcher is then enabled again (e.g., as part of package replacement 710 of service provider application 310).

Figure 10:
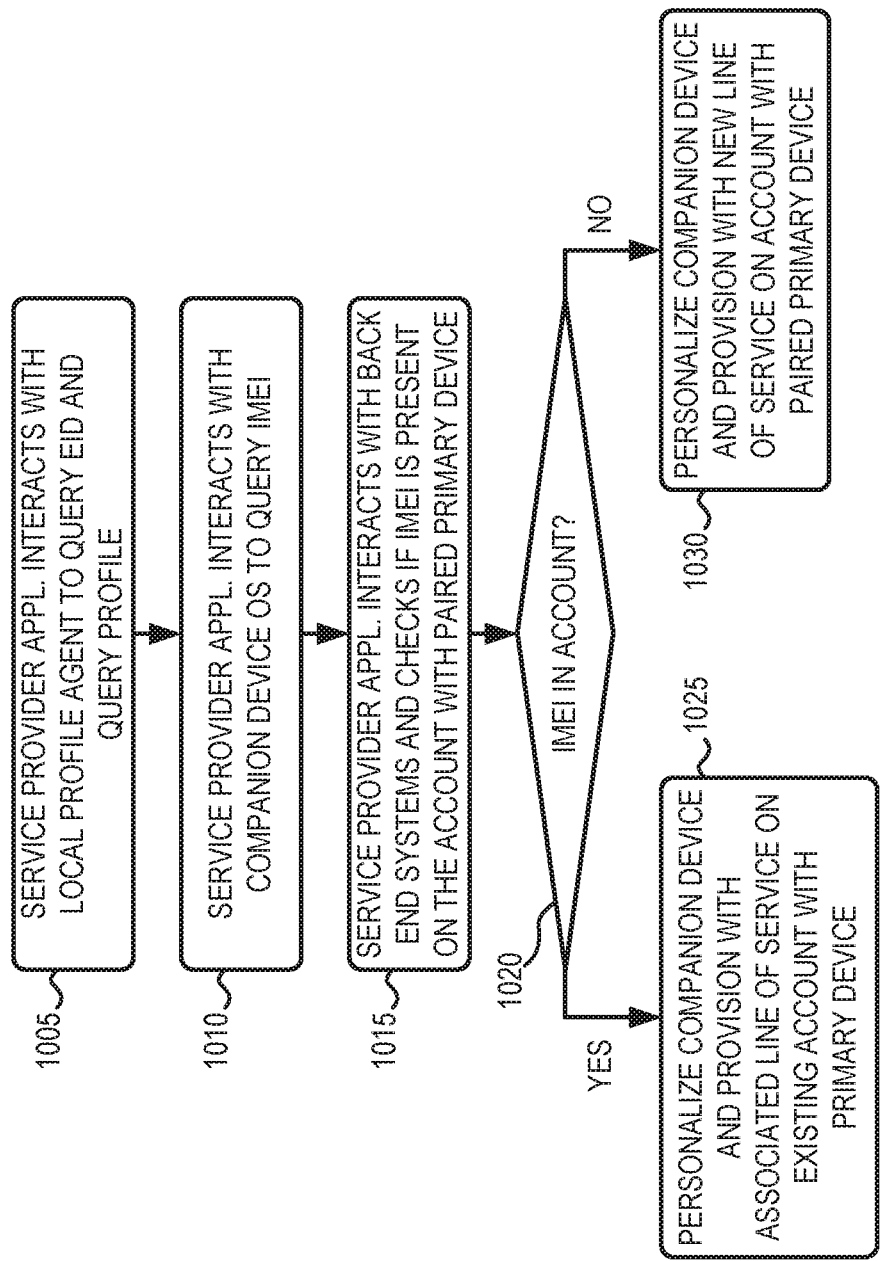

FIG. 10 provides an illustration of a use case for restoring a deleted profile from companion device 140, according to an implementation. A user (e.g., end customer) may delete the profile downloaded on companion device 140 intentionally or inadvertently. In such cases, companion device 140 may or may not be able to attach to the carrier network. A few different use cases can arise. In one instance, there may be no profile on companion device 140, and companion device 140 has an active line of service on an account. The same account user as before wants to re-activate this watch. In another instance, there may be no profile on companion device 140, and companion device 140 has an active line of service on an account. But a different account user wants to activate companion device 140. In still another instance, there may be no profile on companion device 140 and no active line of service on any account.

As shown in the process flow of FIG. 10, service provider application 310 on companion device 140 may interact with local profile agent 320 to query EID and query Profile (block 1005, corresponding, e.g., to reference 715 of FIG. 7). Service provider application 310 may also interact with the companion device OS 330 to query the IMEI of companion device 140 (block 1010, also corresponding, e.g., to reference 715 of FIG. 7). Service provider application 310 may interact with backend systems in core network 110 or service network 120 to determine if the IMEI stored in OS 330 is present on the account of primary device 150 (block 1015, corresponding, e.g., to reference 725 and 730 of FIG. 7).

If the IMEI of companion device is present on the account of primary device 150 (block 1020—Yes), service provider application 310 may initiate procedures to personalize companion device 140 and provision companion device 140 with the already associated line of service on the existing account of primary device 150 (block 1025). If the IMEI is not present on the account of primary device 150 (block 1020—No), service provider application 310 may personalize companion device 140 and provision companion device 140 with a new line of service on the account of paired primary device 150 (block 1025). In one implementation (e.g., if companion device 140 had an active line of service on another account), the back end provisioning may include deactivating the line for companion device 140 associated with the previous account.

Figure 11:
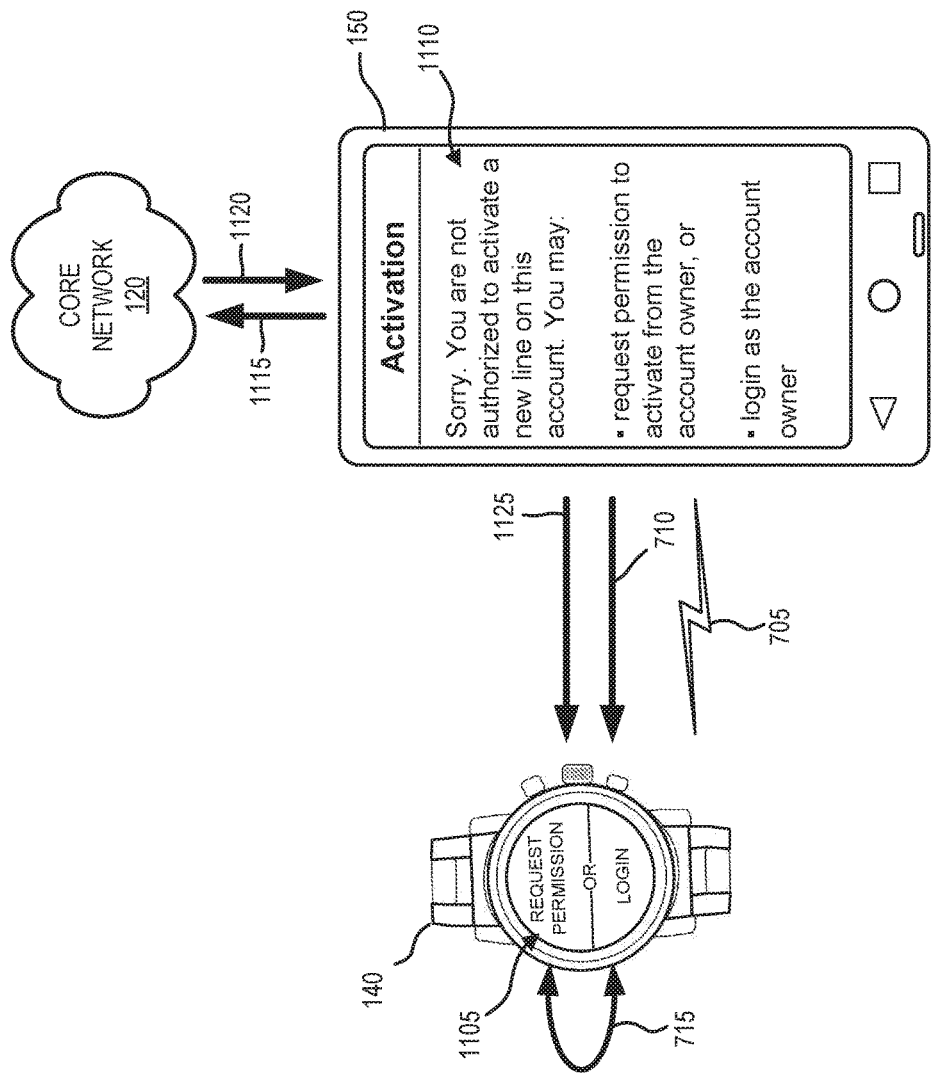
FIG. 11 is an illustration of a use case for end-user interactions during a first time synchronization of a companion device with primary device, according to an implementation described herein.

FIG. 11 provides an illustration of a use case for end-user interactions during a first time synchronization of companion device 140 with primary device 150, according to an implementation. In the example of FIG. 11, assume the end-user of primary device 150 is an account member without authorization to add services to the account (e.g., in contrast with an account owner, such as would be the case in the example of FIG. 7).

As shown in FIG. 11, an activation process may include pairing 705, package replacement 710, and queries 715 as described above in connection with FIG. 7. When query 715 indicates that the end-user of primary device 150 is an account member without authorization to add services to the account, service provider application 310 may present options 1105 to the user including (1) notify the account owner and (2) sign in as the account owner. In one implementation, using local connection 705, service provider application 310 may have service provider activation application 420 provide additional information 1110 via primary device 150.

If a user selects an option from options 1105 to notify the account owner, service provider application 310 or service provider activation application 420 may automatically send a text message (e.g., and SMS or another type of message) to the account owner. For example, primary device 150 of the account member can send a text message 1115 (e.g., in real time) to the account owner to get approval for adding companion device 140 to the account. The account owner can approve. This approval may be relayed back to the account member via a push notification 1120 which says "owner has approved." The push notification may be relayed 1125 to companion device 140. The account member can then initiate the process of personalization and provisioning as described above in connection with FIG. 7 (e.g., reference 725 and following).

If a user selects an option from options 1105 to sign in as the account owner, the account member can request the account owner to sign in on the account member's primary device 150. Once the sign in is successful, the personalization/provisioning process can execute on the Smartphone as described above in connection with FIG. 7.

According to implementations described herein, association of user information from primary device 150 and device information from companion device 140 facilitates self-serve personalization and remote provisioning of the eUICC for companion device 140. In some implementations, detection of a SIM profile and/or obtaining a new SIM profile from companion device 140 may be performed in a manner that is transparent to the user after an initial authorization by chaining multiple authorization steps using service provider application 310 and service provider activation application 420. Use of primary device systems and methods described herein may also enable a manufacture of companion device 140 to provide a single device for a global platform, allowing a local SIM profile (e.g., for service providers of a particular country or continent) to be obtained upon device activation.

Systems and methods described herein enable an end user to self-serve activate for cellular service of an eUICC companion device via a network connection to a primary device with intuitive minimal user input without requiring any specific companion device information to be entered, such as IMEI, EID, ICCID, or activation QR code or similar code. Additionally, the systems and methods provide a solution for a situation where re-personalization of eUICC profile is required to restore cellular service of a companion device due to an event where a functioning user profile is missing or damaged, regardless of whether a companion device has a pre-installed eUICC with a pre-personalized eUICC profile.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS.

6 and 10, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
receiving, by a primary user device, input to initiate a cellular service activation process for a companion device, wherein the companion device includes a preloaded version of a service provider application for facilitating remote provisioning;
providing, by the primary user device and to the companion device, an updated version of the service provider application that replaces the preloaded version;
receiving, by the primary user device, and from the companion device, an embedded universal integrated circuit card (eUICC) identifier for the companion device;
forwarding, by the primary user device and to a network device in a service provider network, the eUICC identifier and an identifier for the primary user device; and
when the network device verifies that the cellular service activation for the companion device can be provisioned under a subscriber account:
receiving, by the primary user device and from the network device, an activation code for the companion device to use to initiate a request for a new line of service for the eUICC identifier; and
forwarding, by the primary user device and to the companion device, the activation code.

2. The method of claim 1, further comprising:
establishing, by the primary user device, a local wireless network connection with the companion device.

3. The method of claim 1, wherein forwarding the eUICC identifier and an identifier for the primary user device comprises:
forwarding data indicating an account standing of a user associated with the primary user device.

4. The method of claim 1, wherein receiving the eUICC identifier further comprises receiving an international mobile equipment identity (IMEI) for the companion device.

5. The method of claim 1, wherein the identifier of the primary user device includes a mobile directory number (MDN).

6. The method of claim 1, wherein the activation code includes information for the companion device to download a subscriber identity module (SIM) profile.

7. The method of claim 1, wherein providing the updated version of the service provider application further comprises:
providing the updated version of the service provider application via a local wireless interface.

8. The method of claim 1, further comprising:
when the network device does not verify that the cellular service for the companion device can be provisioned under the subscriber account:
presenting, by the primary user device and to a user, additional information to supplement a query by the companion device.

9. The method of claim 1, wherein providing the updated version of the service provider application includes providing the updated version of the service provider application to a wearable device or an embedded device.

10. The method of claim 1, further comprising:
determining that a user of the primary user device is not authorized to add a line of service to the subscriber account;
determining that the user of the primary user device requires authorization from an owner of the account; and
automatically generating a message to send to the account owner when the user of the primary user device requires authorization.

11. A user device, comprising:
a network interface with a transceiver to communicate with one or more remote devices:
an input component;
one or more memories storing an activation application for cellular service activation of a companion device; and
a processor to execute instructions in the activation application to:
receive input to initiate a cellular service activation process for the companion device, wherein the companion device includes a preloaded version of a service provider application for facilitating remote provisioning,
provide, to the companion device, an updated version of the service provider application that replaces the preloaded version;
receive, from the companion device, an embedded universal integrated circuit card (eUICC) identifier for the companion device;
forward, to a network device in a service provider network, the eUICC identifier and an identifier for the user device, and when the network device verifies that the cellular service activation for the companion device can be provisioned under a subscriber account:
receive, from the network device, an activation code for the companion device to use to initiate a request for a new line of service for the eUICC identifier; and
forward the activation code to the companion device.

12. The user device of claim 11, wherein the processor is further to execute instructions in the activation application to:
establish a local wireless network connection with the companion device.

13. The user device of claim 11, wherein, when forwarding the eUICC identifier and an identifier for the user device, the processor is further to execute instructions in the activation application to:
forward data indicating an account standing of a user associated with the user device.

14. The user device of claim 11, wherein, when receiving the eUICC identifier, the processor is further to execute instructions in the activation application to:
receive an associated international mobile equipment identity (IMEI) for the companion device.

15. The user device of claim 11, wherein, when forwarding the activation code, the processor is further to execute instructions in the activation application to:
forward information for the companion device to download a subscriber identity module (SIM) profile.

16. The user device of claim 11, wherein the processor is further to execute instructions in the activation application to:
determine that a user of the user device is not authorized to add a line of service to the subscriber account;
confirm that the user wants to request authorization from an owner of the subscriber account; and
automatically generate a message to the account owner when the user wants to request authorization.

17. The user device of claim 11, wherein the user device includes a smart phone, and wherein the companion device includes a wearable device.

18. A non-transitory computer-readable medium storing instructions executable by a computational device to:
receive input to initiate a cellular service activation process for a companion device, wherein the companion device includes a preloaded version of a service provider application for facilitating remote provisioning,
provide, to the companion device, an updated version of the service provider application that replaces the preloaded version;
receive, from the companion device, an embedded universal integrated circuit card (eUICC) identifier for the companion device;
forward, to a network device in a service provider network, the eUICC identifier and an identifier for a primary user device, and
when the network device verifies that the cellular service activation for the companion device can be provisioned under a subscriber account:
receive, from the network device, an activation code for the companion device to use to initiate a request for a new line of service for the eUICC identifier; and
forward the activation code to the companion device.

19. The non-transitory computer-readable medium of claim 18, wherein the instructions to forward the eUICC identifier further comprise instructions to:
forward an international mobile equipment identity (IMEI) for the companion device.

20. The non-transitory computer-readable medium of claim 18, further comprising instructions to:
determine that a user of the primary user device is not authorized to add a line of service to the subscriber account;
request the user to sign in as an owner of the subscriber account; and
receive the activation code when the user signs in as the owner of the account.

* * * * *